Patented Nov. 12, 1935

2,020,713

UNITED STATES PATENT OFFICE 2,020,713

CERAMIC MASSES PREVENTING THE FORMATION OF CARBON DEPOSITS

Hans Wolf and Hermann Leuchs, Ludwigshafen-on-the-Rhine, Germany, assignors to I. G. Farbenindustrie Aktiengesellschaft, Frankfort-on-the-Main, Germany No Drawing. Application August 4, 1931, Serial No. 555,074. In Germany March 22, 1928

2 Claims. (Cl. 106—11)

The present invention relates to the prevention of carbon deposits in and on heated ceramic masses. This application is a continuation-in-part of our application Ser. No. 347,171, filed March 14, 1929.

It is known that, at high temperatures, ceramic masses, which contain iron or ferric oxide, will give rise to the deposition of carbon from gases, such as producer-gas and the like which contain carbon compounds. Thereby, as a rule, the ceramic masses such as bricks not only suffer superficial modification in consequence, but also their internal structure is modified resulting in destruction of the masses. In certain cases, for example in regenerators, the bricks are rendered unserviceable, even in the absence of actual destruction, because the pores become choked with carbon and thus the exchange of heat is impaired.

We have now found that the deposition of carbon in ceramic masses which term, when used in the specification and the appended claims, is to be understood as including mortar, containing iron or iron oxide and coming into contact, at high temperatures, with gases containing carbon compounds, can be prevented by giving the said materials a content in copper in the form of copper compounds. The content of copper compounds in the ceramic masses must not exceed 0.2 per cent calculated as metal. In most cases a content of copper compounds not exceeding 0.12 per cent and very often even a content below 0.1 per cent, for example 0.03 per cent, is sufficient to prevent deposition of carbon. Generally speaking, with mortars the amount of copper compounds to be incorporated therewith to prevent deposition of carbon is even smaller as with bricks. The optimum amount of copper compounds to be incorporated in the ceramic masses depends on the composition of the ceramic masses and their structure and can easily be ascertained by tests which consist in passing over the ceramic masses carbon monoxide at the temperatures at which the said masses are to be used. The tests are preferably carried out at about 500° C. All copper compounds are suitable for the purpose of the invention, for example copper salts, such as copper sulphate and copper nitrate or complex copper compounds, for example ammoniacal solutions of copper compounds, or copper oxides. In order to obtain the desired result, it is immaterial whether the copper compounds be added during the production of the ceramic masses, by employing cupriferous initial materials, or by introducing the copper compounds, preferably in the form of a solution or suspension, during any stage of the manufacture of the masses, or whether the copper compounds be added to the finished product, or article formed therefrom, by mixing, impregnating, spraying, brushing or in any other suitable way.

If the copper compounds be added during the production of the ceramic masses, it will be sufficient to treat with cupriferous substances, or suspensions, or solutions of the same, only the ferruginous component of the initial material employed for the production of the ceramic mass.

In order to facilitate absorption of the copper compounds, wetting agents of any convenient kind, such as alkylated aromatic sulphonic acids, or salts of the same, may be added with advantage to the ceramic masses, or to the initial materials of same, or to the copper solutions or suspensions of the copper compounds.

The following example will further illustrate the nature of the invention which, however, is not restricted thereto.

Example

Burnt fire-clay bricks containing about 1.46 per cent of $Fe_2O_3$ are wetted with a 10 per cent solution of ammoniacal copper sulphate, or immersed for a few minutes in the solution and allowed to drain after removal, the bricks being then dried in the air. The copper content of the impregnated and dried bricks is 0.12 per cent according to analysis. Even after prolonged service, for example when used for lining a brown-coal producer, no deposit of carbon is found on the bricks.

Burnt fire-clay bricks having an iron content corresponding to 0.43 and 0.54 per cent of $Fe_2O_3$ impregnated in the same manner caused no deposition of carbon when heated in a carbon monoxide atmosphere.

What we claim is:—

1. Ceramic masses containing iron or iron oxide to be used in conjunction with hot gases containing carbon compounds and, in which no carbon is deposited from said gases containing carbon compounds when coming into contact therewith at high temperatures, said ceramic masses containing an amount of a copper compound not exceeding 0.2 per cent of their weight calculated as metallic copper.

2. Burnt fire-clay bricks containing iron or iron oxide to be used in conjunction with hot gases containing carbon compounds and, in which no carbon is deposited from said gases containing carbon compounds when coming into contact therewith at high temperatures, said fire clay bricks containing an amount of a copper compound not exceeding 0.2 per cent of their weight calculated as metallic copper.

HANS WOLF.
HERMANN LEUCHS.